T. J. MURPHY.
ELECTRIC MOTOR.
APPLICATION FILED OCT. 20, 1915.

1,262,599.

Patented Apr. 9, 1918.
3 SHEETS—SHEET 3.

UNITED STATES PATENT OFFICE.

THOMAS JOSEPH MURPHY, OF ROCHESTER, NEW YORK, ASSIGNOR OF ONE-HALF TO JAMES P. B. DUFFY, OF ROCHESTER, NEW YORK.

ELECTRIC MOTOR.

1,262,599.   Specification of Letters Patent.   Patented Apr. 9, 1918.

Application filed October 20, 1915. Serial No. 57,011.

*To all whom it may concern:*

Be it known that I, THOMAS J. MURPHY, a subject of the King of Great Britain, and a resident of Rochester, in the county of Monroe and State of New York, have invented a certain new and useful Electric Motor; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to rectifiers and it has for its object to provide a means for rectifying an alternating current to produce a unidirectional current. The system is specially designed for rectifying alternating currents to be used for lighting purposes and particularly to be used to produce a steady arc light of high candle power for moving-pictures. It also provides means whereby the alternating current of suitable potential may be obtained from the supply mains if for any reason it is desired to use an alternating current in place of the rectified current.

It also has for its object to provide a novel means for preventing hunting of the synchronizing device.

The invention may be contained in many forms of electrical devices which come within the purview of my claims hereinafter appended. To show the practicability of my invention, I have selected a construction and a system in which it may be used, as an example, to illustrate the operativeness of constructions containing the invention.

Figure 1:
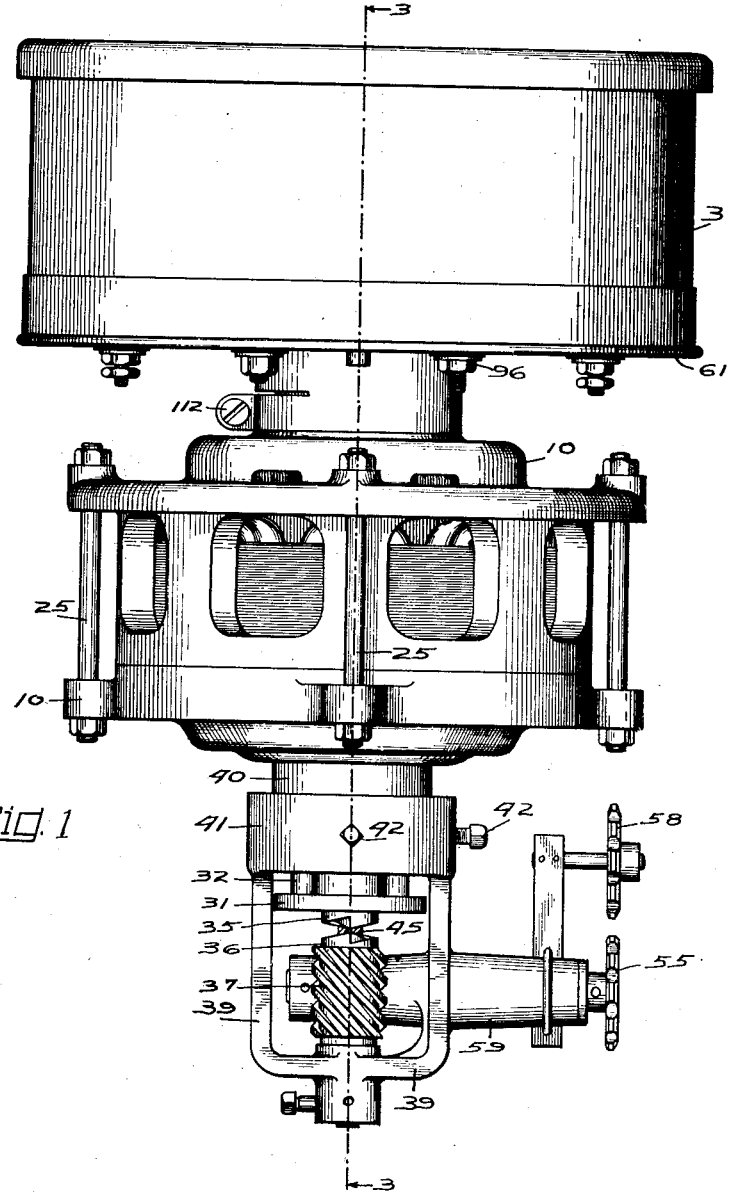
Figure 2:
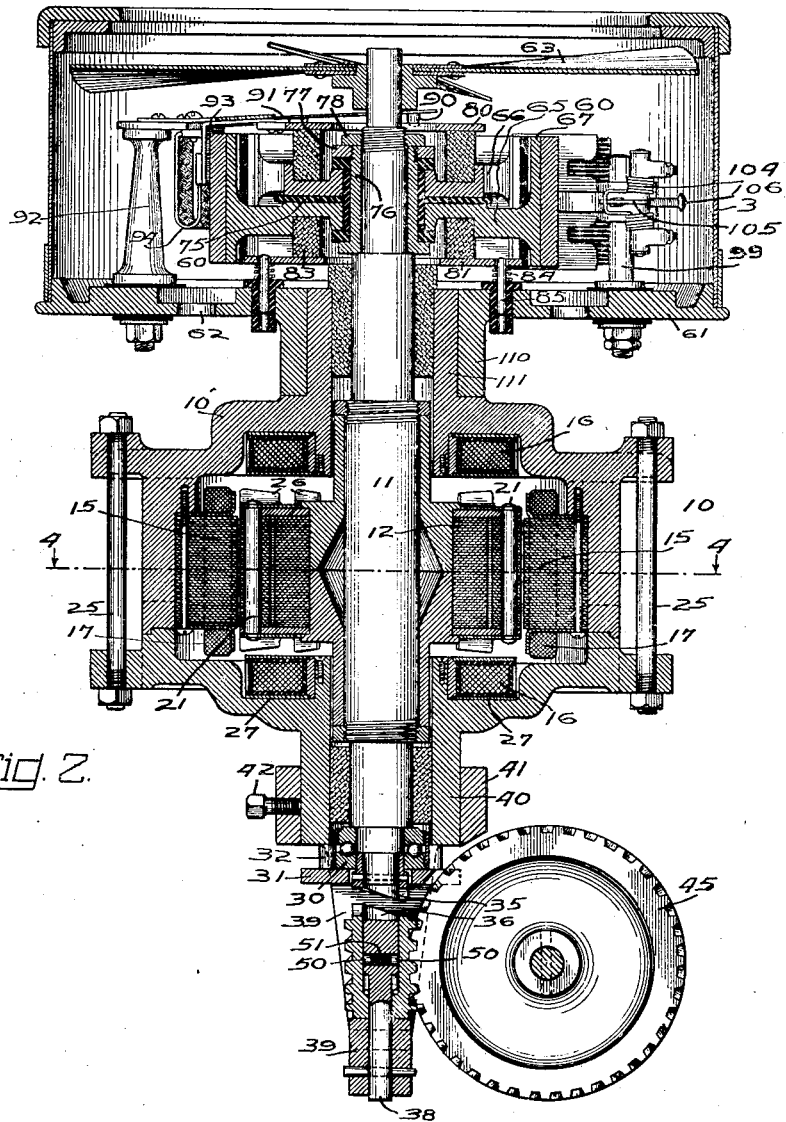
Figure 3:
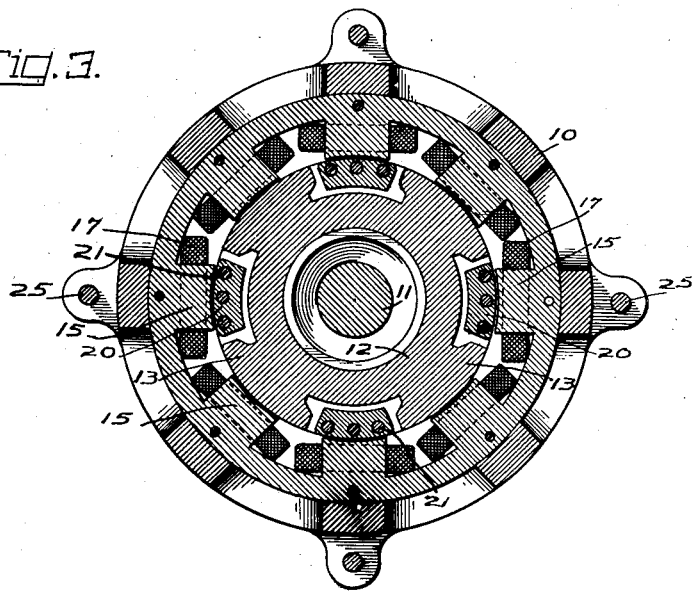

Figure 1 illustrates the synchronizing means. Fig. 2 is a vertical sectional view taken on the line 3—3 indicated in Fig. 1. Fig. 3 is a sectional view of the stator and rotor of the synchronizing device taken on the line 4—4 indicated in Fig. 2.

10, Fig. 1, is a synchronous motor. It is provided with a shaft 11 to which is secured the rotor 12. The rotor 12 is provided with poles 13, while the stator of the motor 10 is provided with poles 15. Direct current coils 16 are located in circular recesses formed in the ends of the motor 10. They operate to produce a constant field in the poles 13. The magnetic circuit of the field extends up through the shaft, through the poles of the rotor, the poles of the stator and the surrounding iron-clad shell of the motor. Coils 17 are connected so as to produce with any given direction of the current, poles of alternate sign or character. The strength and character of the poles 15 change as the alternating current changes in the manner well known in the art, which causes rotation of the rotor.

In order to prevent hunting of the rotor, inserts 20 are located between the poles 13 of the rotor. The inserts 20 are formed of laminations which are bound together by the rods 21. This produces local induced currents of large quantity when the rotor 12 is out of step with the current passing through the coils 17 located on the poles 15. The inserts will produce a large corrective flux from a small variation in the field or from a small current inducing field. If the rotor tends to hunt, that is, if it tends to speed up by the reason of the attraction of the advanced poles and repulsion of the following poles or to slow down by reason of any counter action of the parts, a large current of more or less quantity is induced in the rods, which are of negligible resistance, which produces a large corrective flux causing the rotor to keep exactly in synchronism with the current changes of the coils of the stator. The inserts being located locally between the poles of the rotor, and in close relation to the poles of the stator, the requisite corrective field is produced which coacts with the poles to produce the requisite correction.

The shell of the motor may be formed in two parts which may be secured together by means of the rods 25. The rotor 12 may be provided with vanes 26 for producing air currents within the stator 10. In order to produce a substantially uniform direct current from a pulsating unidirectional current the coils 16 may be wound in, or contained in spools of copper 27. The shaft 11 is supported on a thrust bearing 30 which in turn rests on a collar 31. The collar 31 is supported on pins 32 which are connected to the lower end of the motor 10.

The clutch member 35 is keyed to the lower end of the shaft 11. The complemental member of the clutch 36 is located on the end of a worm 37 which is movable lengthwise and rotatively on the spindle 38. The spindle 38 is supported in the U-shaped bracket 39 which may be secured to the neck 40 of the motor casing by means of a collar 41, which is provided with the bolts 42 for locking the collar to the motor casing of shell. A worm gear wheel 45 is pivotally supported on a bracket forming a part of the U-shaped bracket 39 and meshes with the worm 37 to cause rotation of the worm. If there is proper frictional engagement between the worm and the spindle 38 or between the worm and the worm gear wheel 45 rotation of the gear wheel 45 will raise the worm 37 so as to cause engagement between the clutch parts 35 and 36. When they thus engage, further rotation of the gear wheel 45 causes rotation of the shaft 11. By this means the rotor 12 which is secured to the shaft 11 will be rotated up to synchronism with the alternations of the electric current which passes through the coils 17 of the stator, whereupon the rotor will be kept in synchronism with the current.

In order to insure connection between the clutch parts 35 and 36 a spring pressed frictionally engaging member may be so located as to retard the action of the worm 37 and cause it to be lifted by the wheel 45 in order to produce rotation of the worm 37. In the form of device illustrated the spindle 38 is provided with a recess in which is located a pair of studs 50 between which is located a spring 51 which operates to push the studs radially outward and press their ends against the surface of the interior of the worm. This gives sufficient friction of the worm to cause it to be lifted by the wheel 45 when the wheel 45 is rotated to produce the clutch engagement.

The wheel 45 is keyed to a shaft which is connected with the sprocket wheel 55. This is connected by means of a sprocket chain 56 to a sprocket wheel which is operated by the handle 57 supported in the shell 1. To take up such slack as may exist in the sprocket chains 56 a sprocket wheel 58 may be provided, which is adjustably secured to the bearing 59 in any way that may be desired.

The commutator 60 is secured on the upper end of the shaft 11 within the head 3. The head 3 may be provided with a base 61 which is supported on the upper end of the motor 10. The base 61 is provided with suitable openings 62 and the inclosing wall of the head 3 may be formed, if desired, of gauze or porous sheet material, such as a plate having a plurality of openings contained therein. The upper end of the head 3 may be open in order to permit circulation of air around the commutator to keep the parts cool. Also, a fan 63 may be keyed to the shaft 11 to produce air currents about the commutator. The commutator is formed of two spiders 65 and 66 having vertically disposed arms 67 which are connected to the arms of the spiders 65 and 66 at points above and below the centers of the vertically disposed arms 67 so that when the spiders 66 and 65 are placed together at their hubs, the ends of the arms 67 will lie in two parallel planes. The arms 67 form engaging faces to which are secured the commutator bars forming thereby dove-tailing teeth which connect alternately with the spiders 65 and 66.

The spiders 66 and 65 are insulated by means of suitable insulating material 75, in the form of a washer and a collar. The spiders and the insulating parts are secured to the shaft 11 by means of the sleeve 76 and the ends 77 and 78. Connection is made with the spiders 65 and 66 through rings 80 and 81 which press against carbon conductors 82 and 83. The carbon conductors 82 and 83 are secured to the spiders 65 and 66. The plate 81 is held up against the carbon ring 83 by means of springs 84 located around the insulatedly supporting pins 85 which extend into the ring plate 81. The ring 80 is provided with recesses in its upper surfaces into which lugs 90 may be yieldingly pressed by means of the elastic arms 91 which are secured to the post 92. This prevents rotation of the ring 80 on the top of the ring 82. A strip 93 is also connected to the ring 80 and a flexible conductor 94 is connected to the strip 93. The flexible conductor 94 is also connected to the post 92. The post 92 is insulatingly supported in the base 61 of the head 3.

Connection may be made through the post 93 with the commutator bars connected to the spider 66.

The brushes are formed of carbon blocks. Preferably a pair of blocks are used in connection with each brush. The posts 99 on which the brushes are supported are insulatingly supported in the base 61 and may be electrically connected with the circuit.

The brushes may be adjustably secured relative to the commutator by means of a boss or collar 110 which is formed integral with the base 61 and is secured to a neck 111 formed integral on the shell of the motor 10 by means of the screw 112 which passes through ears formed on each side of the split portion of the boss 110.

Having thus described my invention, what I claim as new, and desire to secure by Letters Patent, is,—

1. In a synchronous motor, the combination of a rotor having a plurality of polar projections, laminated squirrel cage inserts located between the polar projections of the rotor and having conductor bars extending through the inserts.

2. In a synchronous motor, the combination of a rotor having a plurality of polar projections, and laminated squirrel cage inserts located between the polar projections of the rotor and in spaced relation with respect to the polar projections of the rotor.

3. In a synchronous motor, the combination of a rotor having a plurality of polar projections, and laminated squirrel cage inserts located between the polar projections of the rotor and in spaced relation with respect to the body of the rotor.

4. In a synchronous motor, the combination of a laminated motor having a plurality of poles, a plurality of laminated squirrel cage inserts located between the polar projections of the rotor and in spaced relation with respect to the polar projections of the rotor, comprising bars and plates secured by the bars of the squirrel cage inserts clamping the said laminations.

5. In a synchronous motor, the combination of a plurality of armature coils, polar projections in number equal to half the number of the armature coils and forming the rotor of the motor, laminated sectors located intermediate the polar projections of the rotor and in spaced relation with respect to the polar projections, and bars uniting the outer layers of the sectors.

In testimony whereof, I have hereunto signed my name to this specification.

THOMAS JOSEPH MURPHY.